INVENTOR.
CALVIN A GONGWER

Oct. 1, 1963

C. A. GONGWER 3,105,456

PRESSURE WAVE GENERATOR

Filed Aug. 9, 1954

INVENTOR.
CALVIN A GONGWER

BY
D. Gordon Argus
ATTORNEY

United States Patent Office 3,105,456
Patented Oct. 1, 1963

3,105,456
PRESSURE WAVE GENERATOR
Calvin A. Gongwer, Glendora, Calif., assignor to Aerojet-General Corporation, Azusa, Calif., a corporation of Ohio
Filed Aug. 9, 1954, Ser. No. 448,445
9 Claims. (Cl. 116—27)

This invention relates to sound generators and has as an object the provision of a simple device for generating high energy sonic waves in a fluid medium.

Presently existing sonic generators, of which piezo-electric, magneto-strictive, and hydraulic ram types are familiar examples, generally suffer from practical limitations which are imposed by the size and complexity of their components. In piezo-electric generators, for instance, the energy obtainable is limited by the small size of the crystals which are available. For such uses as underwater signaling, and seismic prospecting, where the generator must be reasonably portable and definitely rugged, magneto-strictive and hydraulic types are too bulky and complex, particularly in low-frequency application.

The present invention provides a simple and portable generator which is capable of producing waves of high power in a surrounding fluid. A feature of the invention resides in a flexible, fluid-tight bladder having valving means connected thereto for alternately connecting the bladder to a source of pressurized gas, and with an exhaust means, whereby the bladder expands and contracts when the valving means are operated. When the unconfined bladder is held submerged in a fluid environment, its volume changes will generate pressure waves in that environment. These pressure waves will be herein referred to as sonic waves regardless of their frequency.

An optional feature resides in a valving arrangement wherein the timing of pressure and exhaust connections to the bladder may be varied relative to each other.

These and other features of the invention will be fully understood from the following detailed description and the accompanying drawyings, of which:

Figure 1:
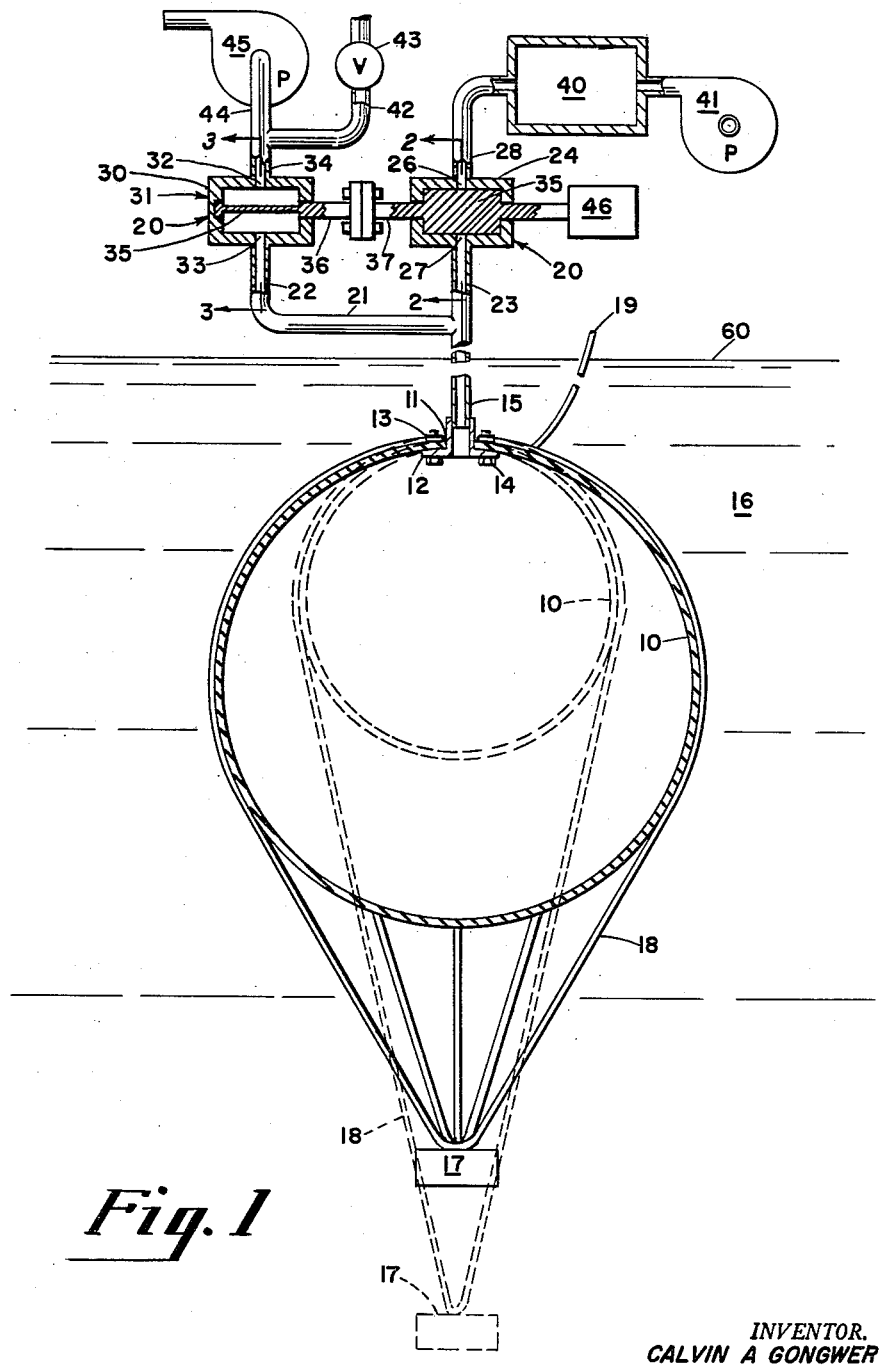
FIG. 1 is a cross-sectional elevation of a sonic wave generator according to the present invention.

Referring now to the drawings, FIG. 1 shows a sonic wave generator having fluid-tight bladder or bag 10, which is preferably spherical. The bladder is shown in a relatively expanded condition in solid line, and in a relatively contracted condition in dotted line. It is made of some resilient substance such as rubber or neoprene which can withstand repeated stretching. An inlet 11 is formed in the wall of the bladder, and a flanged tube 12 is fitted in the inlet with the flange inside the bladder and the tube projecting from the inlet. A sealing ring 13 is placed around the tube outside the bladder, and bolts 14 are passed through the flange, bag and ring to hold them tightly together, creating a fluid-tight joint. A bladder supply conduit 15, preferably of flexible hose which can withstand bending is fitted to the joint, at the tube 12.

The flexible bladder is held submerged and unconfined under the surface 60 of a body of water 16 such as lake or the sea. It is held down by a sinker 17 attached to a rope net 18 which loosely surrounds the bladder. The net will be made larger than the bladder so as not to restrict its expansion. A cable 19 is looped through the net to support the bladder, thereby taking the strain off of the bladder supply conduit when the device is towed.

The bladder supply conduit 15 leads upward to connect with valving means 20. These valving means have a lower manifold 21 with two arms 22, 23, which arms are part of the bladder supply conduit means. A first valve 24 having a cylindrical case 25 with a pressure inlet port 26 and an oppositely disposed bladder supply port 27 therein interconnects arm 23 (and thereby the bladder supply conduit 15) with a pressure supply conduit 28. A flat rectangular vane or shut-off member 29 is rotatably mounted in case 25 with its axis of rotation perpendicular to a line between ports 26 and 27. A second valve 30, having a cylindrical case 31 with an exhaust port 32 and a bladder supply port 33 disposed opposite to each other in the case wall, interconnects arm 22 (and thereby the bladder supply conduit 15) with an exhaust conduit 34. A flat rectangular vane or shut-off member 35 is rotatably mounted in case 31 with its axis of rotation perpendicular to a line between ports 32 and 33. The two rectangular vanes are joined together by central shafts 36, 37 which may be bolted together by bolts 38 in flanges 39 so that the relative angular position of the vanes may be adjusted as desired. The vanes are rotated as a single unit by a variable speed motor 46. It will be appreciated that the cases may be other than cylindrical, and the vanes other than flat and rectangular, the criterion being the provision of a rotary valve which can be alternately turned on and off.

The pressure supply conduit leads to a surge tank or accumulator 40, which receives a supply of pressurized working gas such as air from a pump 41. The exhaust conduit 34 has two branches. The first branch 42 leads through a valve 43 directly to the atmosphere. The second branch 44 leads to an exhaust pump 45 which may also exhaust directly to atmosphere.

Figure 4:
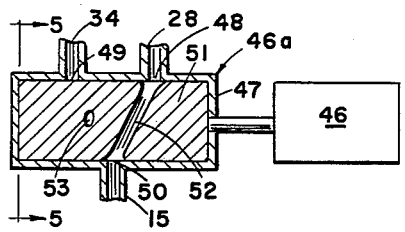
FIG. 4 is a cross-section of valving means which may be used in place of those shown in FIG. 1.
Figure 5:
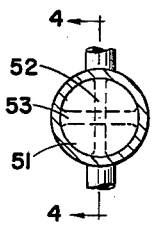
FIG. 5 is a cross-section taken along line 5—5 of FIG. 4.

FIGS. 4 and 5 illustrate an optional form of valving means which may be substituted for the valving means 20 of FIG. 1. These valving means 46a have an outer case 47 which is pierced by a pressure inlet port 48, and an exhaust outlet port 49, and by a bladder supply port 50 located on the side of the outer case opposite the inlet and exhaust ports.

A rotary plug 51 fits within the case 47 and has two drilled passageways therein: a pressure inlet-to-bladder supply port passageway 52; and an exhaust outlet-to-bladder supply port passageway 53, these passageways being drilled through the plug askew to each other. Passageway 52 will interconnect the pressure inlet and the bladder supply port at one rotary position of the plug, and passageway 53 will interconnect the exhaust outlet and the bladder supply port at some other rotary position of the plug. The ends of these passageways may be flared somewhat (see FIG. 5) to extend the duration of registration of the passageways with the ports as the plug is turned. When valving means 46a are used in place of valving means 20, exhaust outlet port 49 connects to exhaust conduit 34, pressure inlet port 48 to pressure supply conduit 28, and bag supply port 50 to bladder supply conduit 15. The plug will be turned by motor 46.

Figure 6:
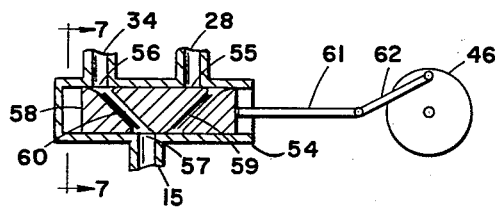
FIG. 6 is a cross-section of still another type of valving means which may be used in place of those shown in FIG. 1.
Figure 7:
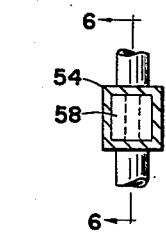
FIG. 7 is a cross-section taken along line 7—7 of FIG. 6.

FIGS. 6 and 7 illustrate still another substitute valving arrangement for the valving means 20 of FIG. 1. This is a slide valve having a case 54 with a pressure inlet port 55 to be connected with pressure supply conduit 28, an exhaust outlet port 56 for connection with exhaust conduit 34, and a bladder supply port 57 for connection with bladder supply conduit 15. This case is relatively elongated to permit a slide member 58 to reciprocate within the case. This slide member has a pressure inlet-to-bladder supply port passageway 59 and an exhaust outlet-to-bladder supply port passageway 60. These passageways are spaced from each other, and lie in the same plane, thereby being adapted to make their connections with the ports at the extreme ends of the slide members reciprocating movement. At the left extreme, as seen in FIG. 6, passageway 59 will interconnect the pressure conduit and the bladder supply conduit. At the right hand extreme, passageway 60 will interconnect the bladder supply conduit and the exhaust conduit. The ends of these passageways may be flared to extend the period of registration. Reciprocating movement is received from a rod linkage 61 between the slide member and a crank 62 which is turned by the motor 46.

The operation of the sonic wave generator of FIG. 1 will now be described. The bladder, weighted by the sinker and suspended by cable 19, is lowered to its operating depth in some fluid environment such as a lake or the sea. Both valves are first closed, and pump 41 is started to charge the accumulator with pressurized gas, compressed air being a preferred substance. If the exhaust pump 45 is to be used, it will also be started at this time, valve 43 being closed. If the air is simply to exhaust to the atmosphere under pressure from the water around the bladder plus pressure resulting from the resilience of the bag, valve 43 will be opened to permit air to flow directly through conduit 42, and the exhaust pump need not be used. If a greater differential pressure is desired, valve 43 will be closed, and exhaust will occur through the pump 45.

Figure 2:
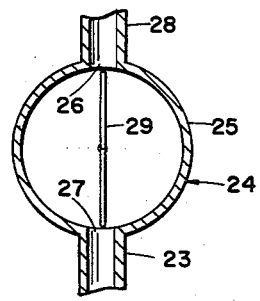
FIG. 2 is a cross-section taken along line 2—2 of FIG. 1.
Figure 3:
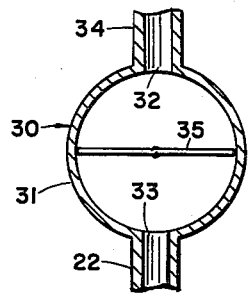
FIG. 3 is a cross-section taken along line 3—3 of FIG. 1.

When the accumulator is charged, the vanes are turned so that vane 29 leaves valve 24 open (FIG. 2) and vane 35 closes valve 30 (FIG. 3). At these valve positions, compressed air flows into the bladder and inflates it. Depending on the use to which the device is to be put, the expanded size may be some maximum which depends on the air pressure, and the depth and resilience of the bladder, or some lesser inflation which depends on the setting of the valving means.

When the bladder is expanded to its working size, the motor is started in continuous operation so it turns the vanes to produce the desired frequency. In the embodiment of FIG. 1, there will be two pressure cycles per revolution of the motor. Continued rotation of the valve member from the initial position where the bladder was inflated shuts off valve 24 and opens valve 30. This permits air to flow out of the bladder to atmosphere and the bag contracts. Still further rotation closes valve 30 and opens valve 24, permitting compressed air to flow into the bladder and inflate it. Only one of the valves is open at a time. The air pressure will have to be greater than the hydrostatic pressure existing at the depth of the bladder in order that such inflation will occur. In this manner, the valving means alternately interconnects the bladder supply conduit with the pressure conduit, and with the exhaust conduit, alternately expanding and contracting the bladder and thereby sending a sonic pressure wave out into the fluid environment.

When the valving means 46a of FIG. 4 are used in place of those of FIG. 1, passageway 52 is first aligned so that compressed air may flow into the bladder. Then the rotary plug is turned at the frequency of the desired wave, since passageway 52 will be in registration only every 360°. Further rotation from the initial position brings passageway 53 into registration with the bladder supply port 50, and permits the air to escape from the bladder. Still further rotation shuts off the exhaust passageway, and passageway 52 again registers to inflate the bladder.

The sliding valve arrangement of FIGS. 6 and 7, which may be substituted for the valving means of FIG. 1 performs the same service. The periodicity is determined by the rate of rotation of the motor, the passageways registering with the proper ports once for each revolution of the crank as the slide member moves back and forth in the case to interconnect first the pressure conduit and the bladder supply conduit, and then the bladder supply conduit and the exhaust conduit. The duration of registration may be increased, while the frequency remains the same, by increasing the flare at the ends of the passageways.

The provision of the spherical fluid-filled bladder under water provides a resonant system which can be driven in strong oscillation with a large amplitude by pulses of compressed air. If the greatest amplitude is sought, the speed of the motor will be adjusted so that the pulses enter at the resonant frequency of the bladder. Of course, the bladder can be operated at other frequencies, and the resonant condition is not restricted to the case where the bladder is submerged in water. This resonant condition can occur in any fluid medium.

In the operation of the device, approximately the same amount of air should leave the bladder during the exhaust period as enters it during the inflation period of each cycle, so that the inflated volume is always nearly the same, and the contracted volume nearly the same. This amount of air depends on many factors, some of which are the depth of the bladder in the water, the elasticity of the bladder, inlet and outlet pressure, length of time the various valves are open, and line capacities. For a given application of the device, these various factors will have to be determined and set, after which adjustment the device may be operated without further attention.

While compressed air has been disclosed to be a preferable working fluid, any other gas may be used advantageously. Gases are necessary because of their compressibility and low viscosity. The natural resilience of the bladder will aid the expulsion of the gas therefrom. Also, numerous other valving arrangements may be developed for controlling the sequence of operation. The principal requirement is a valving means for alternately connecting the bladder with a source of working gas and with an exhaust means.

A sonic generator according to this invention is portable and easily adjusted to the conditions needed for various applications. Its essential working parts comprise only valving means and an expansible bag, along with a supply of pressurized gas. It has a resonant condition permitting the generation of an exceptionally high power. The periodicity is adjusted simply by controlling the speed of a motor. In addition, no preparation need be made in the surrounding where the generator is operated. This generator is, therefore, a simple, portable and rugged device for generating sonic waves of predetermined properties, which waves may have high energy and a wide range of frequencies. It has the further advantage that it can produce waves of low frequency with its small size, at which low frequencies other devices, such as magnetostrictive and hydraulic ram types, tend to become excessive in size. The waves produced will be found useful in such diverse fields as underwater signaling and seismic exploration.

In the present invention the bladder is unconfined during operation, and may freely expand and contract. This is an advantage over some previously known pressure wave generators which require the rigid enclosure of the wave-generating means for effective transmission of pressure waves.

My invention is not to be limited to the embodiments described in the description and illustrated in the drawings, which are given by way of example and not of limitation, but only in accordance with the scope of the appended claims.

I claim:
1. A generator for developing pressure waves in a surrounding fluid medium comprising a flexible fluid-tight bladder adapted to be filled with gas and having an inlet, said bladder having a flexible vibratory wall, a source of pressurized gas, valving means movable alternately from a first position to a second position for controlling flow of the gas into and out of the bladder, bladder supply conduit means interconnecting the valving means and bladder inlet, a pressure conduit interconnecting said source with said valving means, exhaust conduit means from the valving means, said valving means in its first position providing communication from said source to said bladder while obstructing communication from said bladder to said exhaust conduit means, and in a second position, obstructing communication from said source to said bladder while providing communication from said bladder to said exhaust conduit means, and driving means connected with said valving means, whereby operation of said driving means causes the valving means in a rapidly alternating manner to interconnect said bladder supply conduit with said pressure conduit and with said exhaust conduit, thereby causing the wall of the bladder to expand and contract respectively in a vibratory manner and thereby creating pressure waves in said surrounding fluid medium.

2. Apparatus according to claim 1 in which the valving means is a rotary valve comprising a case having three ports connected respectively to the pressure conduit, the exhaust conduit, and the bladder supply conduit; and a rotatable plug within the case having two passageways therein arranged skew to each other, a first of said passageways interconnecting the ports connected to the pressure conduit and bladder supply conduit in at least one plug position, and the second of said passageways interconnecting the ports connected to the exhaust conduit and bladder supply conduit in some other plug position.

3. Apparatus according to claim 1 in which the valving means is a slide-type valve comprising a casing having pressure inlet, exhaust, and bladder supply ports connected with the pressure supply conduit, exhaust conduit and bladder supply conduit respectively, and a slide member within the case and reciprocable therein between two extreme positions, said slide member having two passageways therethrough, a first one of which registers with the bladder supply port and the pressure supply port in one extreme position, the other passageway registering with the bladder supply port and the exhaust port in the other extreme position, only one of said registrations occurring at any given time.

4. Apparatus according to claim 1 in which the gas is compressed air.

5. Apparatus according to claim 1 in which the bladder is held under water by a sinker attached to a net which loosely surrounds the bladder.

6. A generator for developing pressure waves in a surrounding fluid medium comprising a flexible fluid-tight bladder adapted to be filled with gas and having an inlet; said bladder having a flexible vibratory wall, a source of pressurized gas; valving means for controlling flow of the gas into and out of the bladder comprising two valves, each valve having two ports, and a shut-off member between said ports for opening and closing the valve of gas therethrough; bladder supply conduit means interconnecting a first port of a first of said valves with the bladder inlet; a pressure conduit interconnecting said pressure source with the second port of said first valve; said bladder supply conduit means also interconnecting a first port of the second of said valves with the bladder inlet; an exhaust conduit connected to the second port of said second valve; driving means for changing the position of said shut-off members; said shut-off members being operatively interconnected so as to open and shut their respective valves at different times whereby working fluid flows through only one valve at a time and whereby operation of said driving means causes the valving means in a rapidly alternating manner to interconnect said bladder supply conduit means with said pressure conduit and with said exhaust conduit, thereby causing the wall of the bladder to expand and contract respectively in a vibratory manner and thereby creating pressure waves in said surrounding fluid medium.

7. Apparatus according to claim 6 in which the shut-off members are rotatably mounted vanes.

8. Apparatus according to claim 6 in which the shut-off members are rotatable plugs having a passageway for interconnecting the ports in at least one position of the plug, said passageway not interconnecting said ports in some other position of the plug.

9. A generator for developing pressure waves in a surrounding water medium comprising a flexible fluid-tight bladder adapted to be filled with gas and provided with an inlet and an outlet, said bladder having a flexible vibratory wall, a source of pressurized gas, a first valve connected between the source and said inlet, an exhaust pump for exhausting gas through said outlet, a second valve connected between the exhaust pump and said outlet, means interconnecting said valves and means for driving said valves in unison, the valves being arranged so that when the first valve is open to permit pressurized gas to enter the bladder the second valve is closed to prevent gas from exhausting through the outlet and when the first valve is closed to prevent pressurized gas from entering through the inlet the second valve is open to permit gas to exhaust through the outlet, said driving means being arranged to open and close said valves in a rapidly alternating manner to expand and contract the bladder so that its wall vibrates.

References Cited in the file of this patent
UNITED STATES PATENTS

| | | |
|---|---|---|
| 1,057,223 | Danenhower | Mar. 25, 1913 |
| 1,453,612 | Williams | May 1, 1923 |
| 1,685,330 | Maroney | Sept. 25, 1928 |
| 1,704,759 | Miller | Mar. 12, 1929 |
| 1,819,703 | Ernst | Aug. 18, 1931 |
| 2,110,522 | Ekman | Mar. 8, 1938 |
| 2,164,858 | West | July 4, 1939 |
| 2,390,847 | Olson | Dec. 11, 1945 |
| 2,582,994 | Kendall | Jan. 22, 1952 |
| 2,792,804 | Bouyoucos et al. | May 21, 1957 |

FOREIGN PATENTS

| | | |
|---|---|---|
| 18,025 of 1908 | Great Britain | June 10, 1909 |